UNITED STATES PATENT OFFICE.

GADIENT ENGI, ARMIN GROB, AND JAKOB WÜRGLER, OF BASEL, SWITZERLAND, ASSIGNORS TO SOCIETY OF CHEMICAL INDUSTRY IN BASLE, OF BASEL, SWITZERLAND.

CHROMIUM COMPOUNDS OF THE GALLOCYANIN SERIES AND A PROCESS OF MAKING SAME.

1,227,407.     Specification of Letters Patent.     Patented May 22, 1917.

No Drawing.     Application filed November 27, 1915. Serial No. 63,828.

*To all whom it may concern:*

Be it known that we, Dr. GADIENT ENGI, Dr. ARMIN GROB, and Dr. JAKOB WÜRGLER, all three chemists, citizens of the Swiss Republic, and residents of Basel, Switzerland, have invented new and useful Chromium-Compounds of the Gallocyanin Series and a Process of Making Same, of which the following is a full, clear, and exact specification.

We have found, that the dyestuffs of the gallocyanin series can be converted into new chromium compounds by treating the said dyestuffs with chromium salts (chromium oxid salts or chromates) in an aqueous solution or suspension, the said new chromium compounds having the valuable property to be fixed directly, that is to say without mordant by the fiber, particularly in printing cotton, wool and silk, and giving thereby vivid tints as fast as the tints obtained with the gallocyanin dyestuffs themselves used as parent materials with employ of mordants, as for instance chromium acetate, chromium fluorid, etc.

The preparation of the new chromium compounds is obtained by reacting on the aqueous solution of the gallocyanins, or of one of their salts with an acid or with a base, with a chromium oxid salt, as for instance chromium fluorid, chromium chlorid, chromium sulfate, chromium acetate, etc., or with a chromate, eventually in presence of sodium acetate or of sodium acetate and acetic acid, till the transformation is complete. The chromium compounds formed precipitate mostly immediately or after cooling in a crystalline form, and, if necessary, they can be salted out by adding common salt. They constitute deep colored powders dissolving in water with violet to blue and green colorations, in concentrated sulfuric acid with characteristic colorations and give in calico-, wool- and silk-printing without mordant vivid prints of excellent fastness.

The process is illustrated by the following examples:

Example 1: 36.5 gr. ordinary gallocyanin (condensation product of nitrosodimethylanilin with gallic acid) in form of the sodium salt, are dissolved in 400 ccm. hot water; to the obtained solution 18 gr. chromium fluorid and 18 gr. calcined sodium acetate are added and the mass is heated for ¼ of an hour until it begins to boil. After cooling the formed chromium compound separates as violet-blue little crystals, which are filtered off, washed and dried or employed directly as paste. The yield is approximately quantitative.

Printed according to the process hereafter described, the new chromium compound gives tints analogous to the tints obtained with ordinary gallocyanin printed with chromium acetate and having the same fastness as these latter tints.

Example 2: 35 gr. gallamin blue (condensation product of nitrosodimethylanilin with gallamic acid) are dissolved in 1 liter cold water; to the obtained solution are added 9 gr. calcined sodium acetate and in the mass is poured a cold solution of 15 gr. sodium bichromate in 150 gr. water and the stirring of the mass continued for ½ an hour. The crystalline chromium compound separated is isolated by filtration and suction, washed with water and employed directly as paste. Printed according to the hereafter given directions it yields the same shades as the gallamin blue printed with chromium acetate. The yield is nearly quantitative.

Example 3: 36.5 gr. celestine blue (condensation product of nitrosodiethylanilin with gallamic acid) are thoroughly stirred with 1 liter water; to this mass are added 9 gr. calcined sodium acetate and 30 gr. acetic acid of 50% and afterward a solution of 15 gr. sodium bichromate in 150 ccm. water is let to flow into the said mass at ordinary temperature. After stirring for ½ an hour, the separated chromium compound is filtered off, washed with water and employed directly as paste. Printed according to the hereafter given directions, it yields considerably bluer tints than the tints obtained by printing celestine blue with chromium acetate. Their fastness is very good. If in the foregoing example the addition of acetic acid is suppressed, the obtained dyestuff yields more reddish prints which correspond nearly to the prints obtained with the celestine blue printed according to the known process.

Example 4: 34 gr. modern violet (leuco derivative of gallamin blue) are transformed into chromium compound according to the process described in Example 2 for the gallamin blue. Printed according to the hereafter given directions it yields tints which are more bluish than those obtained with modern violet according to the usual process.

Example 5: 39 gr. bromogallamin blue, prepared according to the application for United States Letters Patent Serial No. 60713, filed November 10, 1915, are dissolved hot in 400 ccm. water; to the thus obtained solution are added 18 gr. chromium fluorid and 18 gr. calcined sodium acetate and the mass is heated for about ¼ hour until it boils weakly. The chromium compound separating by cooling is filtered off, washed and eventually dried. Printed without chromium it yields tints which are analogous to those obtained with bromogallamin blue and chromium acetate.

In an analogous manner is carried out the preparation of chromium compounds of other gallocyanin dyestuffs, as for instance of the various phenocyanins, modern cyanins, chromocyanins, coreins, ultracyanins, dolphin blue, chromacetin blue, sulfureted gallocyanins, etc.

The transformation of the new chromium compounds into leuco derivatives is obtained by their reduction according to known methods; for this purpose there can be used as a starting material the isolated chromium compounds or the solutions or suspensions obtained by transforming the gallocyanin dyestuffs by means of chromium oxid salts or chromates can be subjected directly to the reduction. Printed according to the process hereafter indicated, the leuco compounds furnish generally some more reddish tints than the chromium compounds from which they are derived. The leuco derivatives constitute green-yellow to olive powders dissolving in sulfuric acid to dirty colored solutions and in water to feebly colored solutions oxidizing in the air to intense violet to blue and green solutions. The vivid prints obtained with these leuco derivatives on calico, wool and silk without mordant show an excellent fastness.

The preparation of the leuco derivatives is illustrated by the following example:

Example 6: 320 gr. of the chromium compound of gallamin blue prepared according to example 2 in form of a paste of 35% (equivalent to 118 gr. dry substance) are suspended into 3 liters water; to this aqueous suspension are added 220 gr. concentrated hydrochloric acid and in the course of 1 hour 50 gr. zinc powder are poured in the mass while stirring this latter at ordinary temperature. After a further stirring for ½ an hour, the mass is filtered and from the filtered liquid the leuco derivative is salted out by adding 900 gr. common salt. After the mass has been abandoned to itself for a certain time, the precipitate is isolated by filtration, washed and dried. Thus the leuco derivative is obtained with good yieldings in form of a green-yellow powder.

The new chromium compounds can be employed for printing as illustrated by the following example:

Example 7: 20 gr. chromium compound of the dyestuff (in form of powder or the corresponding quantity of paste) are heated to 90° C. with 100 ccm. concentrated formic acid and 100 ccm. water and to the obtained mass 10 gr. concentrated hydrosulfite N F, 650 gr. starch-British-gum thickening (for printing wool British-gum thickening) and 120 ccm. water are added, or 20 gr. leuco derivative of the chromium compound of the dyestuff are dissolved in 100 ccm. concentrated formic acid and 100 ccm. water and to the obtained solution are added 650 gr. starch-British-gum thickening (for printing wool British-gum thickening), 2 gr. concentrated hydrosulfite N F and 128 ccm. water.

One of these colors is printed on the goods and the latter are dried, steamed for 1 hour at a steam pressure of ¼ atmosphere over the ordinary atmosphere pressure and washed and dried. Before steaming the goods may eventually be passed for 5 minutes through a Mather-Platt apparatus at 102 to 105° C.

What we claim is:

1. The described process for the manufacture of chromium compounds of the gallocyanin series, consisting in treating the dyestuffs of the gallocyanin series in an aqueous solution with chromium salts and isolating the thus obtained chromium compounds.

2. The described process for the manufacture of chromium compounds of the gallocyanin series, consisting in treating the dyestuffs of the gallocyanin series in an aqueous solution with chromium salts and reducing the thus obtained chromium compounds.

3. As new products the described chromium compounds of gallocyanin dyestuffs constituting deep colored powders dissolving in water with violet to blue and green colorations, in concentrated sulfuric acid with characteristic colorations and giving in calico-, wool- and silk-printing without mordant vivid prints of excellent fastness.

4. As new products the described leuco derivatives of chromium compounds of gallocyanin dyestuffs, constituting green-yellow to olive-colored powders, dissolving in concentrated sulfuric acid to dirty colored solutions and in water to feebly colored solutions which oxidize in the air to intense violet to blue and green colored solutions, and giving in calico-, wool- and silk-printing without mordant vivid tints of excellent fastness.

In witness whereof we have hereunto signed our names this 30th day of October, 1915, in the presence of two subscribing witnesses.

Dr. GADIENT ENGI.
Dr. ARMIN GROB.
Dr. JAKOB WURGLER.

Witnesses:
ARNOLD ZIEBER,
AMAND RITTER.